United States Patent [19]

Diaz et al.

[11] Patent Number: 5,338,824
[45] Date of Patent: Aug. 16, 1994

[54] REMOVAL OF ALKALI METAL METHOXIDE CATALYST RESIDUE FROM HYDROXY-TERMINATED CONJUGATED DIENE POLYMERS

[75] Inventors: Zaida Diaz, Houston, Tex.; Raymond C. Tsiang, Taipei, Taiwan

[73] Assignee: Shell Oil Company, Houston, Tex.

[21] Appl. No.: 87,646

[22] Filed: Jul. 6, 1993

[51] Int. Cl.$^5$ ................................................ C08F 6/08
[52] U.S. Cl. ...................................... 528/482; 528/498
[58] Field of Search ................................ 528/482, 498

[56] References Cited

U.S. PATENT DOCUMENTS

| | | | |
|---|---|---|---|
| 4,039,593 | 8/1977 | Kamienski et al. | 526/55 |
| 4,250,270 | 2/1981 | Farrar | 528/482 |
| 5,212,285 | 5/1993 | Diaz et al. | 528/482 |

FOREIGN PATENT DOCUMENTS

| | | |
|---|---|---|
| 0152792 | 9/1981 | Fed. Rep. of Germany . |
| 3520103 | 12/1986 | Fed. Rep. of Germany . |

*Primary Examiner*—Joseph L. Schofer
*Assistant Examiner*—Tom Weber
*Attorney, Agent, or Firm*—Donald F. Haas

[57] ABSTRACT

A process for removing alkali metal alkoxide catalyst residue from anionically polymerized hydroxy terminated conjugated diene polymer. The process comprises contacting a solution of such a polymer with an adsorbent which can be an ultrastable Y zeolite in the hydrogen form or a large pore size, low surface area cationic exchange resin.

4 Claims, No Drawings

REMOVAL OF ALKALI METAL METHOXIDE CATALYST RESIDUE FROM HYDROXY-TERMINATED CONJUGATED DIENE POLYMERS

BACKGROUND OF THE INVENTION

This invention relates to a process for separating a polymerization catalyst from a polymer. More particularly, this invention relates to a method for removing alkali metal catalyst contaminants, particularly lithium methoxide, from an anionically polymerized hydroxy-terminated conjugated diene polymer.

Alkali metals, particularly lithium, have long been used in catalysts to promote anionic polymerization of conjugated dienes. Heretofore, several methods have been proposed for separating such compounds from a polymer, particularly a conjugated diolefin polymer. In general, these methods involve contacting the polymer and the alkali metal containing composition with water and/or an acid. A principal problem associated with these methods is that each introduces an impurity to the polymer which must be removed before the polymer is suitable for at least most end use applications. These methods, then, add a rather complicated separation step to the process. U.S. Pat. No. 5,177,297 describes how a magnesium phosphate compound can be used to remove lithium contaminants from conjugated diene polymers, specifically copolymers thereof with vinyl aromatic hydrocarbons. U.S. Pat. No. 4,855,409 describes how the same magnesium phosphate compounds can be used to remove alkali metals from polyols. However, these materials have been proven ineffective in removing lithium contaminants from hydroxy-terminated conjugated diene polymers and therefore, there is a need for a method for removing alkali metal, especially lithium, contaminants from such hydroxy-terminated polymers. The present invention provides such a method.

SUMMARY OF THE INVENTION

The present invention provides a method of removing alkali metal methoxide catalyst residue from an anionically polymerized hydroxy-terminated conjugated diene polymer. The method comprises contacting a solution of the polymer with an adsorbent which is an ultra stable Y zeolite. A large pore size, low surface area cationic exchange resin can also be used. The preferred alkali metal is lithium.

DETAILED DESCRIPTION OF THE INVENTION

Anionic polymerization of conjugated diene hydrocarbons with lithium initiators is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

X—B—Li
X—A—B—Li
X—A—B—A—Li
Li—B—Y—B—Li
Li—A—B—Y—B—A—Li wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

Dilithium initiation with the diadduct of sec-butyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymer structures has been sufficient to provide dilithium initiation.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy, or amine groups by reaction with ethylene oxide, carbon dioxide, a protected hydroxystyrene monomer, ethylene oxide plus epichlorohydrin, or the amine compounds listed in U.S Pat. No. 4,791,174, respectively.

The termination of living anionic polymers to form functional end groups is described in U.S. Pat. Nos. 4,417,029, 4,518,753, and 4,753,991 which are herein incorporated by reference. Of particular interest for the present invention are terminal hydroxyl, carboxyl, phenol, epoxy, and amine groups.

Hydrogenation of at least 90%, preferably at least 95%, of the unsaturation in low molecular weight butadiene polymers is achieved with nickel catalysts as described in U.S. Pat. Nos. Re. 27,145 and 4,970,254 and U.S. patent application Ser. No. 07/785,715, now U.S. Pat. No. 5,166,277, which are incorporated by reference herein. The preferred nickel catalyst is a mixture of nickel 2-ethylhexanoate and triethylaluminum described in more detail in Example 1 below.

If too much catalyst residue remains in the polymer after polymerization and reaction to produce the hydroxy-terminated polymer, the hydrogenation step will be adversely affected because alkali metal alkoxides, specifically lithium methoxide, will deactivate the hydrogenation catalyst. Obviously then, it is highly advantageous to remove as much of the alkali metal from the polymer as possible prior to hydrogenation.

While a number of other methods have been unsuccessful, it has been found that it is possible to remove alkali metal alkoxide catalyst residues from such polymers and decrease the level of the alkali metal, especially lithium, to below 10 ppm. This method is carried out by taking a solution of the polymer in an organic solvent (the polymer cement from the polymerization step can be used) and contacting the solution with an adsorbent which can be an ultrastable Y zeolite in the hydrogen form or a large pore, low surface area cationic exchange resin. An ultrastable Y zeolite in the hydrogen form is the acid form of a Y-framework aluminosilicate which exhibits very high thermal stability. These large pore, low surface area cationic exchange resins are either strongly or weakly acidic and have macroporous structures. Specific examples of such adsorbents which can be used herein include Valfor CP 300-56, Amberlyst 15 and Duolite C464. By large pore we mean greater than 150 angstroms in diameter and by low surface area we mean less than 100 $m^2/g$.

The method of contacting the polymer solution with the adsorbent may be carried out in a number of ways. For example, it may be carried out as a batch reaction in a stirred kettle. However, it is preferred that the adsorbent be placed in a fixed bed or a series of fixed beds through which the polymer solution flows. If this method is followed, it is possible to lower the alkali metal or lithium content of the polymer to below 10 ppm.

The polymers of the invention have the conventional utilities such as forming coatings, sealants, and binders. In addition, the butadiene polymers having about two or more terminal hydroxyl groups can be copolymerized with conventional compounds during production of polycarbonates, polyesters, and polyamides as described in U.S. Pat. No. 4,994,526 which is incorporated herein by reference.

EXAMPLE 1

A number of adsorbents were tested to determine if they would remove lithium from a polymer solution of a polybutadiene diol having a molecular weight of 2500. The polymer was dissolved in a solution of cyclohexane. The initial lithium content of the polymer solution was 34 parts per million. Adsorbent was added to the cement so that the cement to adsorbent weight ratio was 50:1. Then the cement/adsorbent mixtures were gently shaken in a flat bed shaker at 23° F. for 22 hours. The results are shown in the table set forth below:

TABLE 1

| Adsorbent | Percent Lithium Removed |
| --- | --- |
| Silica Beads CB83-427 | nil |
| Alumina DD420 | nil |
| K-SORB | nil |

TABLE 1-continued

| Adsorbent | Percent Lithium Removed |
| --- | --- |
| Amberlyst XN-1010 | nil |
| Duolite C464 | 35 |
| Amberlyst 15 | 41 |
| H-USY | 97 |

Amberlyst XN-1010 is a strongly acidic cationic exchange resin having a large surface area (540 $m^2/g$) and a small pore diameter (50 angstroms). Amberlyst 15 is a strongly acidic cationic exchange resin having a small surface area (50 $m^2/g$) and a large pore diameter (240 angstroms). Duolite C464 is a weakly acidic cationic exchange resin having a small surface area (3 $m^2/g$) and a large pore diameter (400 angstroms). It is thought that the reason why the latter two remove lithium whereas the first did not is that large surface area, small pore diameter cationic exchange resins are ineffective whereas small surface area, large pore diameter cationic exchange resins are effective. H—USY is a ultrastable Y zeolite in the hydrogen form made by PQ Corporation. K—SORB is a magnesium phosphate adsorbent made by Manville Corporation. Alumina DD420 is a wide pore alumina from Discovery Chemical. Silica beads CB83-427 is a wide pore silica manufactured by Shell Ghent.

The results shown in the table clearly show that the ultrastable Y zeolite produces outstanding results. The results also show that the two large pore, low surface area cationic exchange resins remove significant amounts of lithium. The other materials were completely ineffective.

We claim:

1. A process of removing an alkali metal alkoxide catalyst residue from an anionically polymerized hydroxy-terminated conjugated diene polymer, which comprises contacting a solution of the polymer with an adsorbent which is an ultrastable Y zeolite in the hydrogen form.

2. The process of claim 1 wherein the alkali metal is lithium and the alkoxide is methoxide.

3. A process of removing an alkali metal alkoxide catalyst reside from an anionically polymerized hydroxy-terminated conjugated diene polymer, which comprises contacting a solution of the polymer with an adsorbent which is a large pore, low surface area cationic exchange resin.

4. The process of claim 3 wherein the alkali metal is lithium and the alkoxide is methoxide.

* * * * *